though the instrument is placed on the
UNITED STATES PATENT OFFICE.

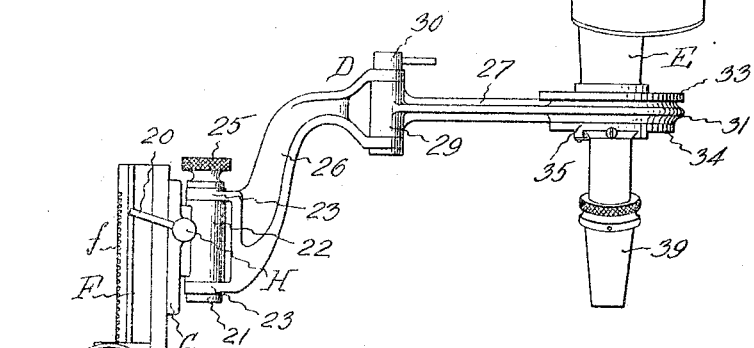
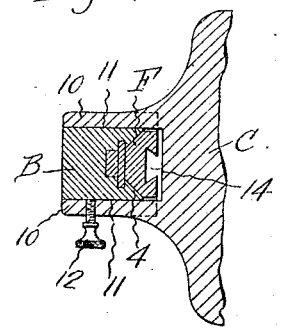
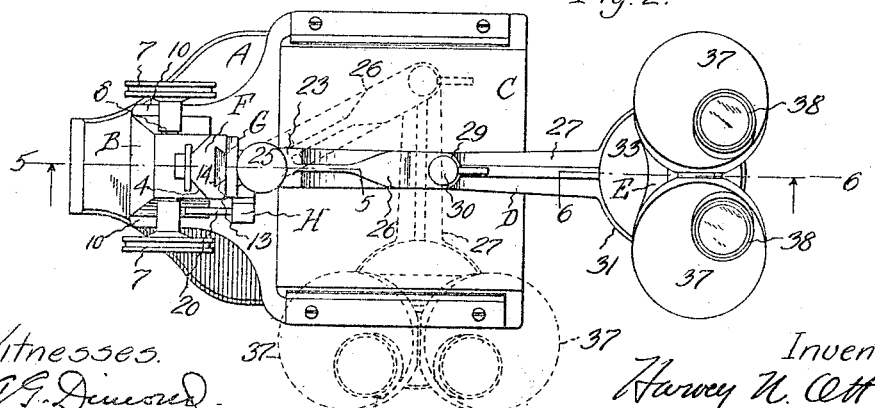

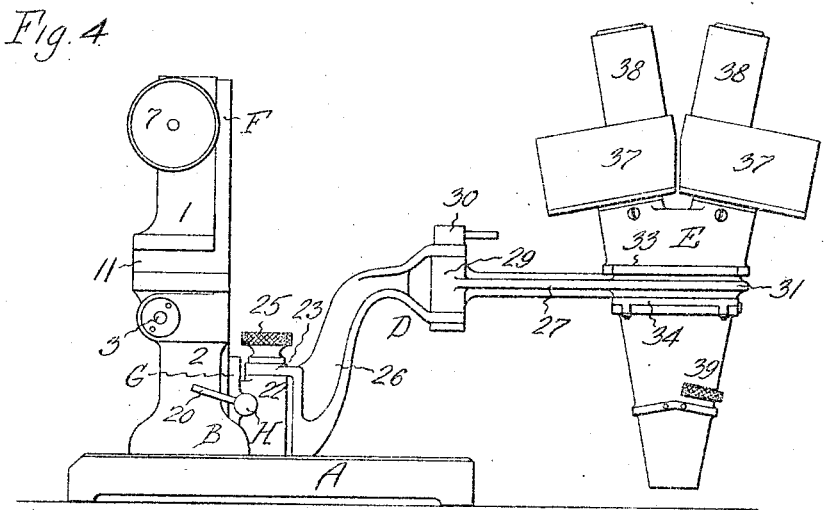
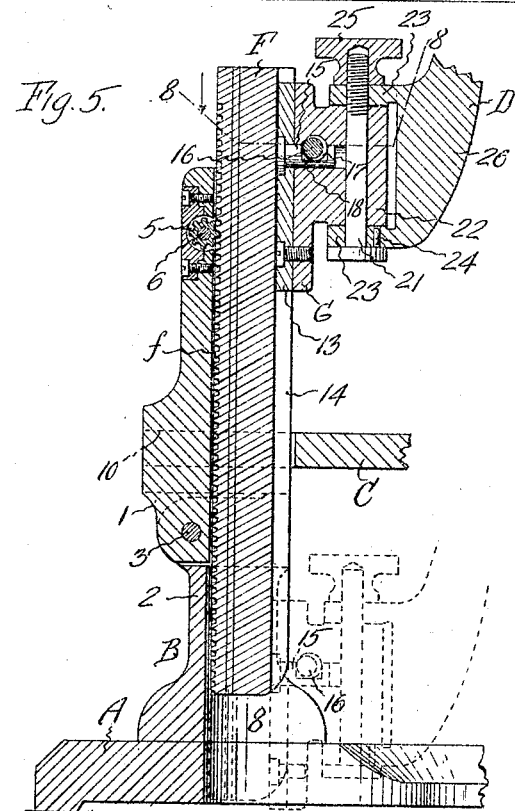
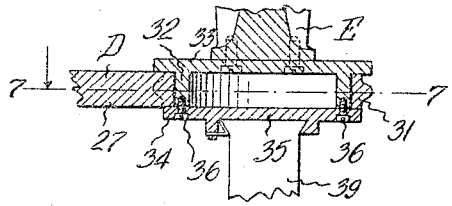
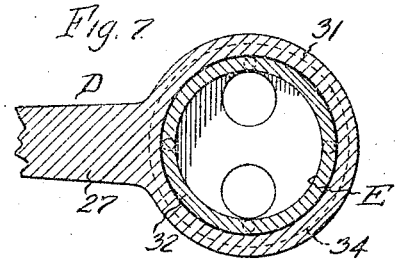

HARVEY N. OTT, OF BUFFALO, NEW YORK, ASSIGNOR TO SPENCER LENS COMPANY, OF BUFFALO, NEW YORK.

MICROSCOPE.

1,197,390.　　　　　Specification of Letters Patent.　　Patented Sept. 5, 1916.

Application filed April 5, 1915.　Serial No. 19,106.

*To all whom it may concern:*

Be it known that I, HARVEY N. OTT, a citizen of the United States, residing at Buffalo, in the county of Erie and State of New York, have invented a new and useful Improvement in Microscopes, of which the following is a specification.

This invention relates to improvements in microscopes and has for one of its principal objects to provide a microscope of a desirable and practical construction which permits a great range of adjustment of the lens tube, whereby the instrument is adapted for various different kinds of work, as for example, for the examination of objects on the stage, for entomological and other work, where it may be desired to examine an insect or other object supported at a considerable elevation above the stage, and for the examination of large objects which cannot be placed on the stage and which make it necessary to place the microscope on the object and lower the lens into proximity to the surface of the object.

Other objects of the invention are to provide a microscope having a removable stage which can be quickly and easily placed in position on or removed from the stand and having the tube arm adjustably mounted on a long vertically-adjustable slide or support, whereby the lens tube can be adjusted to the required elevation above the stage for examining various objects supported on the stage, or the stage can be removed and the lens tube lowered for examining an object located below the plane of the stage or on which the instrument may be placed; also to construct and mount the tube arm so that in addition to its vertical adjustments the lens tube can be adjusted horizontally to different desired positions toward and from the supporting upright or laterally, as may be desirable in examining differently placed objects or different portions of a large object; also to swivel a binocular lens or body tube on a horizontally adjustable arm so that when the arm is moved horizontally to different positions the body tube can be rotatably adjusted to place the eye pieces in the most advantageous position for use.

In the accompanying drawings: Figure 1 is a side elevation of a binocular microscope embodying the invention. Fig. 2 is a plan view thereof. Fig. 3 is a horizontal section in line 3—3, Fig. 1, showing the means for removably securing the stage on the upright support. Fig. 4 is a side elevation of the microscope showing the stage removed and the lens tube lowered to a position for examining an object at the base of the instrument. Fig. 5 is a fragmentary vertical sectional elevation, on an enlarged scale, of the stand in line 5—5, Fig. 2. Fig. 6 is an enlarged sectional elevation in line 6—6, Fig. 2, showing the swivel connection for the body tube. Fig. 7 is a horizontal section in line 7—7, Fig. 6. Fig. 8 is a sectional plan view of the adjustable support for the arm in line 8—8, Fig. 5.

A binocular microscope is illustrated in the drawings since some features of the invention are especially desirable in connection with this type of instrument. The invention is not, however, restricted in application to binocular microscopes.

The microscope stand comprises, as usual, a base A which may be of any suitable form, preferably of the usual bifurcated or U-shape, an upright supporting post or column B, a stage C, and an arm D which supports the body tube E and is mounted to slide vertically on the post B to adjust the body tube toward and from the object to be examined. The post B is preferably of the usual construction, having upper and lower sections 1 and 2 connected by a hinge joint 3 which permits the upper section 1 to be tilted to support the body at an inclination. The arm D, as usual, is supported by and projects from a vertical rack bar or slide F which is arranged to slide vertically in a suitable guide 4 on the upper section 1 of the post B and is adapted to be adjusted vertically by the usual pinion 5 which meshes with rack teeth *f* on the slide F. The pinion 5 is secured on a shaft 6 which is suitably journaled on the post section 1 and is provided with the usual wheels 7 or handles at its ends for turning it to adjust the slide F up and down. The lower section 2 of the post B is provided at its front side with a vertical cavity 8 adapted to receive the lower end of the slide F when the latter is lowered as shown in Fig. 5. The slide F is preferably about the length of the post B and is adapted to be raised and lowered through a distance substantially equal to its length, thus enabling a great range of vertical adjustment of the body tube which is supported thereby. This invention is not restricted to the manner in which the slide is mounted on the post and adjusted, and it can be mounted and adjusted in any suitable way.

The stage C is removably secured on the upper section 1 of the post B in any suitable manner permitting the stage to be readily and easily placed in position and firmly secured, or detached. As shown, the stage is provided at its rear side with rearwardly projecting parallel arms 10 which are adapted to straddle the slide F and the upper section 1 of the post B and slip into horizontal seats or grooves 11 in the opposite sides of the post. The stage is secured on the post by a set screw 12 which passes through a screw-threaded hole in one of the arms and is adapted to bear at its inner end against the post. By loosening the screw, the stage with the usual accessories thereon can be slipped off of the post.

The arm D is mounted on a supporting bracket or block G which is adapted to be secured at different elevations on the slide F and the arm is preferably, as shown, hinged to the bracket G so as to swing laterally, and is composed of inner and outer sections connected by an elbow or joint which permits the outer section of the arm to be swung to different angular relations to the inner section of the arm. As shown, the bracket G is provided with a dove-tailed tongue 13 which fits and is adapted to slide up and down in a longitudinal dove-tailed guide groove 14 in the slide F, the bracket being secured in the position to which it is adjusted on the slide by a suitable clamp H. The clamp shown consists of a bolt or pin 15, Figs. 5 and 8, which is arranged to slide endwise in a horizontal hole in the bracket and is provided at its inner end with an enlarged head which engages the inner side of the guide tongue 13 which is movably secured to the bracket. The clamp bolt 15 is moved endwise to clamp or release the bracket by a shaft 16 which is journaled in a bearing hole extending crosswise in the bracket and is provided with an eccentric portion 17 arranged to turn in a slot 18 in the clamping bolt 15, so that by rocking the shaft the bolt is moved outwardly or inwardly to pinch the bevel edges of the guide groove between the tongue and the body of the bracket to clamp or release the bracket. The eccentric shaft 16 is retained in its bearing and prevented from endwise movement by a small screw 19 in the bracket which extends into a circumferential groove in the shaft. The shaft is provided at its outer end with a handle 20 of any suitable kind for turning it. By loosening the clamp H the arm-supporting bracket G can be moved up or down to any desired position on the slide F and secured in such position by tightening the clamp H. The bracket G can, if desired, be secured to the upper end portion of the slide as shown in Figs. 1 and 5, so that when the slide is raised the body tube will be supported high above the stage, or the bracket can be secured to the lower portion of the slide, so that by lowering the slide after the stage has been removed the body tube can be supported with the objective close to the surface on which the microscope rests, as shown in Fig. 4, thus permitting the examination of an object on which the microscope rests. The slide F, as shown in Fig. 5, passes through the opening between the securing arms of the stage C and is adapted to be moved up and down through this space to any desired position. The arm-supporting bracket G could be constructed, adjustably mounted on, and secured in adjusted positions on the slide in any other suitable way.

As shown, the arm D is hinged at its inner end on the bracket G to swing laterally by a vertical bolt 21 which extends through hinge lugs 22 and 23 on the bracket and on the arm D. The bolt 21 is provided at its lower end with a head having a vertical pin 24 which enters a hole in the bottom hinge lug 23 of the arm D for holding the bolt from turning, and a nut 25, screwed on the threaded upper end of the bolt, engages the upper hinge lug of the arm. When the nut is loosened the arm can be swung laterally on the bracket G, as indicated by dotted lines in Fig. 2, and the arm can be stationarily secured in any desired angular position by tightening the nut 25 to clamp the hinged lugs of the arm and bracket firmly together. The inner and outer sections 26 and 27 of the arm can be hinged together so as to permit the outer section to swing to different angular relations to the inner section by any suitable kind of a hinge joint 29. This joint can, if desired, be constructed like the joint connecting the inner section of the arm to the bracket G.

30 represents a nut provided with a handle for turning it to loosen the joint 29 to permit the outer arm section to be swung relative to the inner section, or to tighten the joint for securing the outer arm section stationarily at the desired angular relation to the inner arm section.

The body tube E is preferably swiveled or supported on the outer end of the outer section 27 of the arm D so that it can be turned about a vertical axis on the arm to the most convenient position for use in the different adjustments of the arm. The tube may be thus swiveled on the arm in any suitable manner. As shown, the outer section 27 of the arm is provided at its outer end with a circular bearing ring 31 and the body tube is provided with a circular bearing portion 32 arranged to turn in this ring and having flanges 33 and 34 above and below the bearing ring which prevent vertical movement of the body tube in the ring. The lower flange 34 is formed by a separate plate 35 which is secured to the bearing portion 32 of the body tube beneath the bearing ring 31, as by screws 36, thus permitting the ready assembling of the parts. The body tube E, except as to being constructed to swivel on the arm, may be of the ordinary construction employed in binocular microscopes and, as shown, is provided with the usual prism chambers 37 containing prisms for erecting the image. These prism chambers carry the eye pieces 38, and as usual, are rotatable on the body tube to vary the pupilary distance between the eye pieces as may be required to suit the eyes of different users. The lower portion 39 of the body tube carrying the objective is removably secured to the plate 35. By employing the jointed arm D hinged to the supporting part, the body tube can be moved to place it over any desired portion of the stage or a large object within the range of the arm, either close to or at a distance from the supporting post and to either side of the central plane of the instrument, and by swiveling the binocular body tube on the arm it can be turned to the most advantageous position for use in any adjustment of the arm.

The described construction adapting the tube supporting arm to be secured at different elevations on a vertically adjustable slide in combination with the removable stage would also be useful in a monocular microscope whether the lens tube be carried by a rigid arm or on a swinging jointed arm, such as illustrated.

I claim as my invention:

1. In a microscope, the combination of a stand, a stage removably secured on said stand, a lens tube, a tube-supporting arm, and means for adjusting said arm up and down on said stand through the horizontal plane of the stage to move the lens tube from a position in which the objective is above to a position in which the objective is below said plane.

2. In a microscope, the combination of a stand, a stage removably secured on said stand, a lens tube, a tube-supporting arm, and a support for said arm which is adjustable up and down on the stand from a point above to a point below the plane of said stage.

3. In a microscope, the combination of a stand, a stage removably secured on said stand, a lens tube, a tube-supporting arm, a support for said arm which is adjustable up and down on the stand to and from a position in which it extends below the stage, and means for securing said arm at different elevations on said support.

4. In a microscope, the combination of a stand, a stage thereon, a slide which is adjustable up and down on the stand from a position above the stage to a position in which it extends below the stage, a tube-supporting arm, means for securing said arm at different elevations on said slide, and a lens tube supported by said arm.

5. In a microscope, the combination of a stand, a stage thereon, a slide which is adjustable up and down on the stand from a position above the stage to a position in which it extends below the stage, a tube-supporting arm which is adjustable on said slide substantially from the upper to the lower end thereof, means for securing said arm at different elevations on said slide, and a lens tube supported by said arm.

6. In a microscope, the combination of a stand, a stage thereon, a slide which is adjustable up and down on the stand from a position above the stage to a position in which it extends below the stage, a tube-supporting arm which is adjustable on said slide substantially from the upper to the lower end thereof, means for securing said arm at different elevations on said slide, and a lens tube supported by said arm, said stage being removable to permit the lens tube to be adjusted through the horizontal plane of the stage to a position in which it extends below said plane.

7. In a microscope, the combination of a stand having a post, a stage which is secured to said post, a slide which is adjustable up and down on said post past said stage, a tube-supporting arm, and means for securing said arm at different elevations on said slide.

8. In a microscope, the combination of a stand having a post, a stage provided with securing arms which straddle said post and removably secure said stage thereto, a slide which is adjustable up and down on said post between said securing arms of the stage, and a tube-supporting arm which is secured to said slide.

9. In a microscope, the combination of a stand, a stage removably secured on the stand, a slide adjustable up and down on the stand, a swinging jointed tube-supporting arm, means for securing said arm at different elevations on said slide, and a lens tube carried by said arm.

10. In a microscope, the combination of a stand, a tube-supporting arm adjustably mounted on the stand, and a binocular lens tube swiveled to turn on said arm.

11. In a microscope, the combination of a stand, a horizontally adjustable tube-supporting arm mounted on the stand, and a binocular lens tube swiveled to turn on said arm.

12. In a microscope, the combination of a stand, a tube-supporting arm mounted on said stand to swing horizontally and comprising inner and outer sections hinged together to permit said outer section to swing to an angular relation to the inner section, and a binocular lens tube swiveled to turn on said outer arm section.

Witness my hand this 1st day of April, 1915.

HARVEY N. OTT.

Witnesses:
A. O. POTTER,
EDWARD E. TROST.

Copies of this patent may be obtained for five cents each, by addressing the "Commissioner of Patents, Washington, D. C."